(No Model.)
H. J. ELLIOTT.
GATE.
No. 290,554. Patented Dec. 18, 1883.
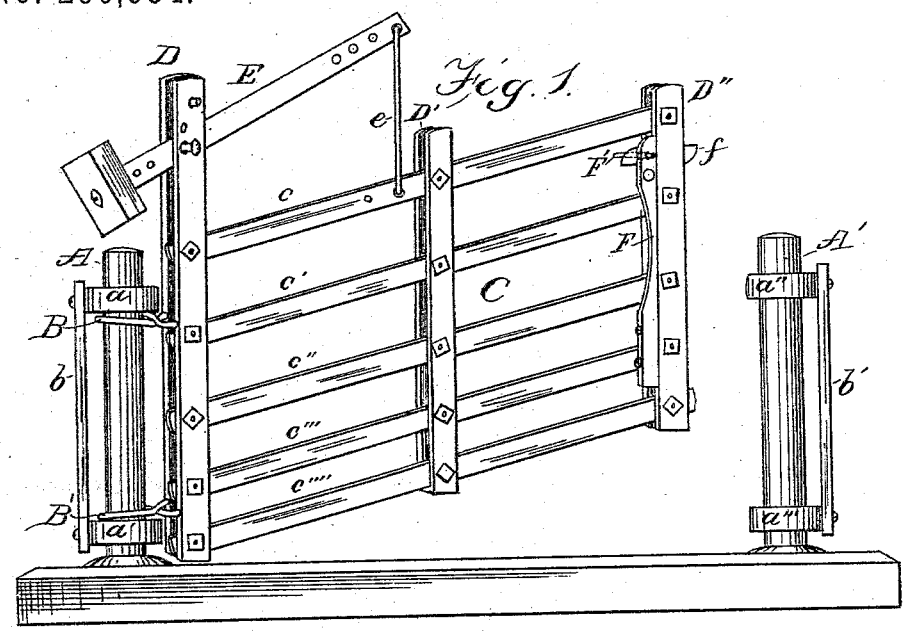

UNITED STATES PATENT OFFICE.

HIEL J. ELLIOTT, OF NORTH MANCHESTER, INDIANA.

GATE.

SPECIFICATION forming part of Letters Patent No. 290,554, dated December 18, 1883.

Application filed May 12, 1883. (No model.)

*To all whom it may concern:*

Be it known that I, HIEL J. ELLIOTT, a citizen of the United States, residing at North Manchester, in the county of Wabash and State of Indiana, have invented certain new and useful Improvements in Gates; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to that class of gates known as "farm-gates," the object being to provide a gate which may be raised or lowered to avoid snow or ice, and to prevent the dragging of the gate upon the ground when it is being opened or shut.

A further object of the invention is to provide a gate with improved fastening or latch devices to prevent animals from opening or lifting the same.

A further object of the invention is to provide a gate which shall be cheap and simple in construction and durable in use.

The invention consists in the improved construction and combinations of parts, as will be hereinafter fully described, and pointed out in the claims.

In the drawings, Figure 1 is a perspective view of my improved gate slightly raised. Fig. 2 is a detail view. Fig. 3 is a view of one of the posts, and Fig. 4 is a view of the device for securing the gate to the post.

A A' represent the posts of the gate, which may be secured to a base of stone, cement, or other material, and provided at their upper and lower ends with rings or collars $a$ $a'$ $a''$ $a'''$. To these rings or collars are secured, by means of screws or other fastenings, rods or braces $b$ $b'$, which prevent the rings or collars from slipping upon the posts A A'. The rod or brace $b$ also serves to keep the gate from opening too wide by stopping it when it is at a right angle to the fence.

B B' represent devices for securing the gate C to the post A, which serve as hinges for the gate to swing upon.

The gate C consists of a series of horizontal bars, $c$ $c'$ $c''$ $c'''$, to which are bolted or otherwise secured vertical bars D D' D''. The bar D extends above the gate, and to it is secured a weighted bar or arm, E, which helps to lift the gate. Said bar or arm is provided with a series of holes or perforations, so that the leverage may be increased or diminished, as desired. The end of the lever E is also provided with perforations to receive one end of a connecting-rod, $e$, which extends from the bar $c$ of the gate to said lever or arm.

To the vertical bar D'' of the gate is secured a spring, F, which is perforated to receive a handle or pin, F'. This pin also extends through the latch $f$, and connects the spring and latch together.

The collar $a''$ is provided with a recess, $f'$, to receive the latch $f$, and the collar $a'''$ is provided with a slot, $f''$, which receives or engages the horizontal bar $c''''$ of the gate, which extends slightly beyond the rest of the bars.

The operation of my improved gate is as follows: The gate being closed, the latch $f$ is drawn back and disengaged from the recess $f'$ of the collar or ring $a''$, and the gate slightly raised to clear the slot and recess of the collars, and is then swung open. If there be snow or ice around the gate, it may be raised to avoid it, the weighted bar E serving to diminish the amount of power that would ordinarily be required were it not used.

It will be apparent from the construction shown and described that my improved gate may be manufactured at a slight cost, and that it is simple and durable.

It will also be seen that many slight changes in the details of construction may be resorted to without departing from the spirit of my invention; hence I would have it understood that I reserve to myself the right to make all such slight changes and alterations in the details of construction as may properly fall within the scope of my invention.

Having fully described my invention, what I claim as new, and desire to secure by Letters Patent, is—

1. The combination, with the posts provided with collars, said collars being connected by rods or braces, as shown, of a gate secured to one of said posts, substantially as set forth.

2. The combination, with the posts A A', provided with collars $a$ $a'$ $a''$ $a'''$, said collars being connected by rods or braces $b$ $b'$, of a gate secured to the post A, having long vertical rear bars, D, a weighted arm, E, pivoted near the top of said bars, and a rod, e, connecting the arm E to the upper horizontal bar of the gate, and a latch device for securing the gate in a closed position, substantially as set forth.

In testimony whereof I affix my signature in presence of two witnesses.

HIEL J. ELLIOTT.

Witnesses:
  WILLIAM B. BROTHERS,
  WASHINGTON FORST.